Jan. 16, 1951   C. B. ISHAM   2,538,563
TIRE COOLING ARRANGEMENT
Filed April 6, 1948   2 Sheets-Sheet 1
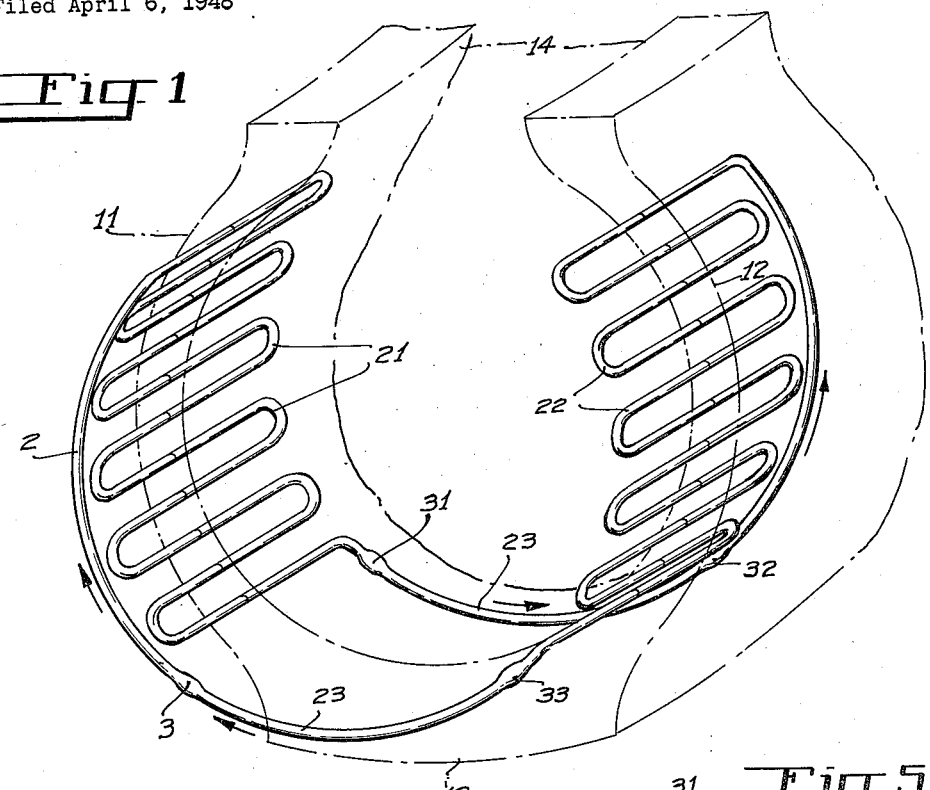
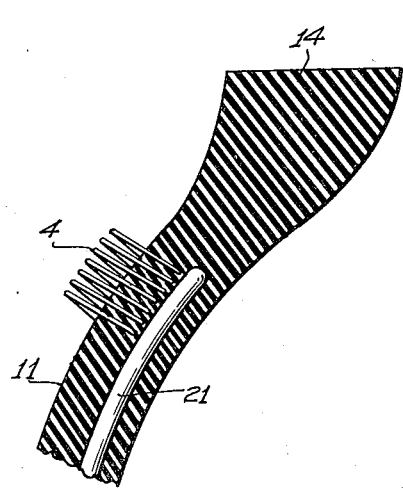
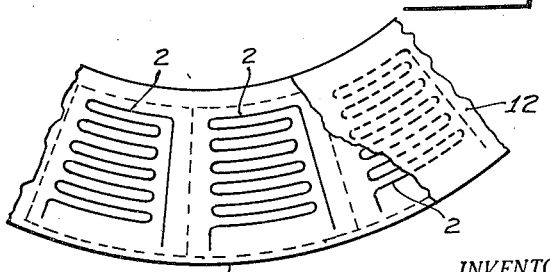
INVENTOR.
CHARLES B. ISHAM
BY
Reynolds+Beach
ATTORNEYS Jan. 16, 1951 C. B. ISHAM 2,538,563
TIRE COOLING ARRANGEMENT
Filed April 6, 1948 2 Sheets-Sheet 2
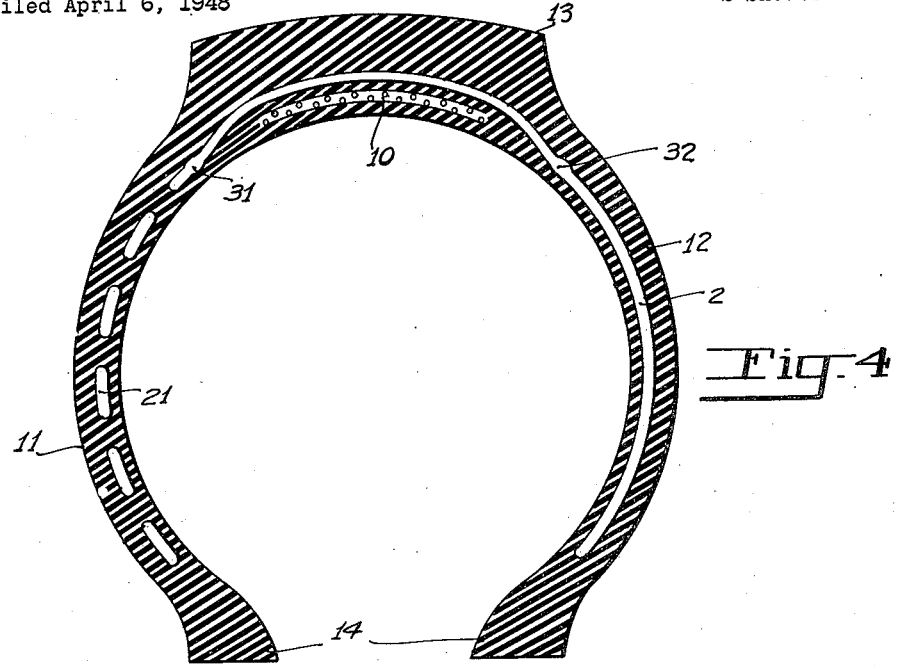
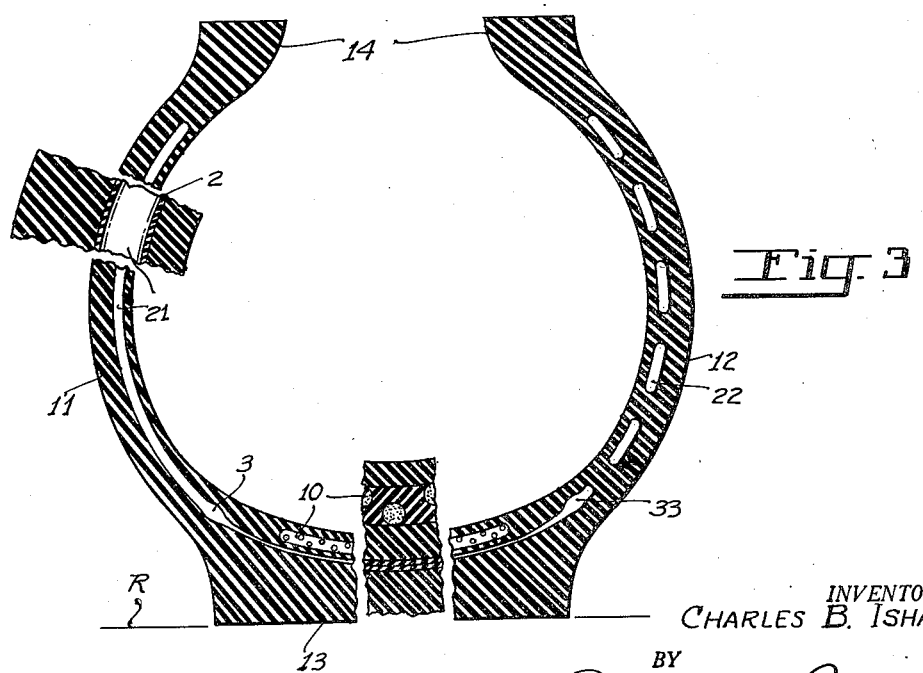
INVENTOR.
CHARLES B. ISHAM.
BY
Reynolds Beach
ATTORNEYS

Patented Jan. 16, 1951

2,538,563

UNITED STATES PATENT OFFICE 2,538,563

TIRE COOLING ARRANGEMENT

Charles B. Isham, United States Army,
North Sacramento, Calif.

Application April 6, 1948, Serial No. 19,348

7 Claims. (Cl. 152—153)

It is well known that deterioration and failure of tire casings on automobiles and trucks, as distinguished from punctures and similar accidental ruptures, is the result primarily of heat generated in the tire casing by its flexure and by friction as the vehicle moves over the roadway, in excess of what can be dissipated from the casing by the relative air. In a properly inflated tire on a reasonably good road surface the greatest heating occurs at the tread, and here or at the juncture between the tread and the side wall occur a large number of blowouts and other failures.

It is a general object of the present invention to provide means whereby the heat thus generated, particularly in the tread section, may be transmitted to and dissipated from the side wall portion of the tire, all by virtue of the repeated road contacts and the action resulting on the tire therefrom, with the result that the action which produces the heat itself effects dissipation of that heat.

More specifically it is an object of the present invention to provide heat transfer means, preferably in the form of a coolant-filled conduit, wholly incorporated within the tire casing, and arranged to circulate the coolant—liquid or gas—from a heated portion, such as the tread portion of the casing, to and completely through a relatively cooler portion, such as the side wall, and back again when sufficiently cooled, picking up the heat at the tread portion and giving it up by reason of the fact that it must pass through and remain within the relatively cooler side wall portion, where it can be dissipated, for a sufficient time to be adequately cooled, all to the ultimate end of avoiding excessive overheating in any one part of the tire casing, and thereby of avoiding the destructive or dangerous effects of such heating.

A still further object is the provision of such cooling means incorporating multiple coolant-filled closed conduits, so arranged and incorporated in the tire casing that a puncture in the region of one such conduit, which may drain the same, will not affect the functioning of the remaining conduits, thus to localize the effect of a puncture as relates to the cooling of the tire casing.

Other subsidiary objects will be ascertainable as this specification progresses.

In the accompanying drawings the invention is shown in certain practical forms of execution, such as illustrate the principles of the invention and as are presently preferred by me, it being understood that various changes may be made in the form, character and arrangement of the parts within themselves and in their relationship to the tire casing without departing from the spirit of the invention as claimed hereinafter.

Figure 1 is an isometric shadow view of a tire casing, sectioned to illustrate the conduit and its relationship to the casing.

Figure 2 is a diagrammatic side elevation of a tire casing, with a portion of the outside layer peeled off to expose the several conduit means incorporated in the casing.

Figure 3 is a transverse sectional view through a tire casing, with broken-out portions enlarged to illustrate the condition of parts during such time as the tread is in contact with the roadway; and Figure 4 is a similar view, showing the relationship of a similar conduit when the treads thereof are above the roadway, out of contact with the latter.

Figure 5 is an enlarged detail sectional view longitudinally of the conduit, showing one of the circulation-controlling valves closed; and Figure 6 is a similar view, showing the same open.

Figure 7 is a detail sectional view of the sidewall portion of a tire casing, illustrating a modified arrangement.

Since the interior construction of the tire casing need not be appreciably modified in order to incorporate my invention, details of such construction have not been shown. The casing as illustrated includes the sidewall portions 11 and 12, the tread portion 13, and the beads 14. A breaker strip 10 may be employed, as is customary, and is only shown in order to illustrate the preferred arrangement, wherein the conduit means is located outside the breaker strip, between the latter and the tread 13.

Incorporated within the casing construction are conduits each generally designated by the numeral 2, which include at least a section 23 located within the tread portion 13 of the casing, and a section 21 located within one of the sidewall portions. Preferably, there are two sidewall sections, so that the sidewall 11 contains the section 21 and the sidewall 12 contains the section 22 of the conduit 2. The conduits have resiliently flexible walls, whereby they may distend and contract, and the section 23 is caused so to contract by the pressure upon the roadway R, in the manner best shown in Figure 3, as this particular section bears the weight of the automobile. This squeezing of the tread section 23 of the conduit squeezes the coolant fluid with which the conduit is filled, an alcohol for instance, into a sidewall section 21, for instance, which thereupon distends in the manner somewhat exaggeratedly shown in Figure 3; compare the full-line and the dot-dash line showings. The distention need be but slight in order to accommodate the small volume squeezed out of the tread section 23, because by preference the sidewall sections of the conduit are of much greater volumetric capacity in the aggregate than the corresponding tread section 23. As soon as the tread which has been thus squeezed rolls from contact with the roadway, the resilience of the tire casing and of the conduit tends to swell the tread section 23 back to its normal size, and create a negative pressure in the tread section, but circulation-controlling means at 3, as is illustrated in detail in Figures 5 and 6, preferably serve to prevent such return by the same path, although similar circulation-controlling means at 31 permit excess liquid which had previously distended the sidewall section 21, but which by now has circulated through the latter, and has been so cooled, to flow again into the now extending tread section 23, without return. Thus a closed circulation is set up, in the preferred arrangement. In the arrangement shown the circulation occurs from one side of the tread section 23 past the non-return valve 3 into the sidewall section 21, thence back past the non-return valve means 31, through the other part of the tread section 23, and thence to the opposite sidewall section 22 past non-return valve means 32, and thence past non-return valve means 33 back to the original part of the tread section 23. So by the alternate flexure and squeezing of the tread section, caused by its repeated contacts of a given section of the tire as it rolls along the roadway, circulation completely through the conduit in a single direction is set up within each such conduit 2.

The form of the non-return valve, such as that at 3, is known, and consists, for example, of complemental rubber shoulders 35 and 36 which may spread apart under the influence of pressure from the left as seen in Figure 6, but which upon closing down will prevent flow in the reverse direction. Such valves are known as Mital valves.

The extent of such a conduit about the periphery of the casing is immaterial. Some portions of a single conduit may be purposely spaced peripherally of the tire casing from other portions in order to take advantage of the difference in flexure as between such different portions. As shown, however, each such conduit occupies a single cross-sectional zone of limited peripheral extent, and there are several such conduits peripherally spaced about the casing, as is indicated in Figure 2. Indeed, they may be manufactured by forming the conduits between two sheets of rubber, or by laying a rubber tube upon a rubber sheet or between two rubber sheets, and the conduits may be supplied in the form of individual or connected patches of rubber sheeting, with or without cord material embedded therein, which may be applied as one of the layers wrapped about the carcass in the manufacture of the casing. Preferably, there are a number of independent or at least non-connected conduits, for the reason that if the casing is punctured in the region of one such conduit, and leakage of fluid therefrom occurs, the fluid is still retained in all the other conduits and the cooling effect on the casing is not greatly reduced. Such arrangements are made clear in Figure 2. The nearer they can lie to the outer surface of the casing the more efficient is the cooling effect, yet they must be embedded deeply enough to avoid damage from scuffing along curbs, etc.

The cooling effect is brought about by reason of the transmission of the fluid, with heat picked up in its passage through the tread section 23, to the relatively cooler sidewalls 11 or 12 of the casing, there by reason of its unidirectional flow through the entire conduit to transmit the excess heat to the sidewall, and thus to dissipate it by conduction to the relative air. If it is desired to increase the cooling effect, there may be incorporated in the sidewall a radiator element such as the metallic coiled spring device as shown at 4 in Figure 7, which is embedded in the sidewall of the casing in heat exchange relationship with the conduit embedded therein, and which in part projects through the sidewall to or into the air, and thus more readily dissipates the heat which it acquires from the liquid within the conduit.

Since the conduits are each of large volumetric capacity, particularly in the sinuous cooling sections 21 and 22, with relation to the liquid volume, and are resiliently expansible, such expansion will accommodate any thermal increase in the liquid's volume. The liquid should have a low freezing point, although if frozen it will soon thaw as the tire rolls over the roadway. It should have a high boiling point, and should not be harmful to the rubber composition which it contacts. Glycols, or like alcohols, will be found well adapted to such use, but no restriction is intended in the choice of a suitable liquid. Indeed, a gas may be used instead of a liquid, as the coolant, or if the pressure generated by change of phase is not excessive, the coolant may be a liquid through a low temperature range and a gas at higher temperatures, perhaps changing phase as it circulates from tread section 23 to sidewall sections, and return.

I claim as my invention:

1. In a tire casing having a tread subject to heating from repeated road contacts, and sidewalls relatively less subject to heating, a coolant-filled conduit incorporated in part within the tread to receive heat therefrom, and in part within the sidewall to deliver heat thereto, for flow of the coolant through said conduit from the tread to the sidewall, and back again to the tread, as the casing flexes and means in said conduit to constrain flow of the coolant unidirectionally from the tread portion and throughout the sidewall portion before returning it to the tread portion.

2. A tire casing as in claim 1, including radiator means lying in part within the sidewall portion, in heat exchange relation to the conduit therein, and in part extending to the exterior of the casing, for dissipation of heat to the atmosphere.

3. In a tire casing having a tread subject to heating from repeated road contacts, and sidewalls relatively less subject to heating, a closed liquid-filled resilient-walled conduit incorporated in part within the tread to receive heat therefrom, and in part within the sidewall to deliver heat thereto, and means in said conduit constraining the liquid squeezed by road contact from the tread section to flow into and distend the sidewall section, and upon termination of such road contact and squeezing to flow from the sidewall section back into the now-relaxed tread section.

4. A tire casing as in claim 3, the circulation-constraining means including two non-return valve means in the conduit arranged the one to block return flow from the sidewall section to the tread section, and the other to block return flow from the tread section to the sidewall section, whereby the liquid flow progresses unidirectionally with each road contact and consequent squeezing of the tread section of the conduit.

5. A tire casing as in claim 3, including a plurality of such conduits, each independent of the others and complete in itself, spaced peripherally about the casing.

6. A tire casing as in claim 3, wherein the conduit extends from an initial point in the tread to one sidewall, thence by way of the tread to the opposite sidewall, and back to the initial point in the tread.

7. A tire casing as in claim 3, characterized in that the sidewall section of the conduit is of large volumetric capacity and the tread section is of small capacity.

CHARLES B. ISHAM.

REFERENCES CITED

The following references are of record in the file of this patent:

UNITED STATES PATENTS

| Number | Name | Date |
|---|---|---|
| 1,038,092 | Craig | Sept. 10, 1912 |
| 1,780,306 | Manly | Nov. 4, 1930 |
| 1,956,739 | Gollert | May 1, 1934 |
| 2,026,161 | Collins | Dec. 31, 1935 |
| 2,368,974 | Dietz | Feb. 6, 1945 |

FOREIGN PATENTS

| Number | Country | Date |
|---|---|---|
| 728,366 | France | July 5, 1932 |